(12) United States Patent
Blair

(10) Patent No.: US 7,390,368 B1
(45) Date of Patent: Jun. 24, 2008

(54) AQUEOUS FIBER OPTIC CLEANER

(75) Inventor: Paul M. Blair, Jonesboro, GA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/924,713

(22) Filed: Oct. 26, 2007

(51) Int. Cl.
 *B08B 1/00* (2006.01)
(52) U.S. Cl. .............................. 134/6; 134/34; 134/36; 134/40; 134/42; 15/104.93; 15/104.94; 510/506
(58) Field of Classification Search .............. 134/6, 134/34, 36, 40, 42; 510/506; 15/104.93, 15/104.94
 See application file for complete search history.

(56) References Cited

U.S. PATENT DOCUMENTS

| | | | |
|---|---|---|---|
| 5,906,686 A * | 5/1999 | McNeil | 134/1 |
| 5,968,283 A * | 10/1999 | Walraven et al. | 134/19 |
| 6,822,016 B2 * | 11/2004 | McCabe et al. | 523/107 |
| 2002/0162582 A1* | 11/2002 | Chu et al. | 134/105 |
| 2003/0005942 A1* | 1/2003 | Johnson et al. | 134/1 |
| 2003/0169991 A1* | 9/2003 | Malevanets et al. | 385/134 |
| 2003/0221706 A1* | 12/2003 | Kiani et al. | 134/6 |
| 2005/0217698 A1* | 10/2005 | Mitchell et al. | 134/6 |
| 2007/0196069 A1* | 8/2007 | Shibata et al. | 385/134 |
| 2008/0000037 A1* | 1/2008 | Christopher et al. | 15/97.1 |

OTHER PUBLICATIONS

"A More Effective Means of Cleaning Fiber Optic Connections in Outside Plant, FTTH and OEM Applications", Ed Forrest, ITW Chemtronics, provided website link is www.chemtronics.com/pdf/upload/A%20More%20Effective%20Means%20of%20Cleaning%20-%20White%20Paper-3%20rev.pdf.

"Fiber Optic Cleaning—Fiber Connector Cleaner", Fiber Optics for Sale Co., Complete Supply Solutions, information regarding fiber optic cleaning and fiber connector cleaners, provided website link is www.fiberoptics4sale.com/Merchant2/fiber-optic-cleaning.php.

"The Combination Cleaning Process (CCpTM)" information regarding the combination cleaning process of ITW Chemtronics, provided website link is http://www.chemtronics.com/pdf/upload/The%20Combination%20Cleaning%20Process.pdf.

"Fiber Optic Connectors" by Force, Inc., 2005, Information regarding parts, installation and cleaning and handling of fiber optic connectors, provided website link is www.fiber-optics.info/articles/connector-care.htm.

"Inspection and Cleaning Procedures for Fiber-Optic Connections" Document ID 51834, Updated Sep. 26, 2006, Cisco Systems, 1992-2006, provided website link is http://www.cisco.com/warp/public/127/cleanfiber2.html.

"Fiber Optic Cleaning Practices", Avici Systems, Inc., 2006, provided website link is avici.com/documentation/PDFDocs/06698-00_revAA.pdf.

* cited by examiner

*Primary Examiner*—Sharidan Carrillo
(74) *Attorney, Agent, or Firm*—Mark W. Croll; Donald J. Breh; Levenfeld Pearlstein, LLC

(57) ABSTRACT

Fiber optic connector end faces are cleaned effectively by exposing the fiber optic connector end face to the disclosed predominantly aqueous solution and wiping the fiber optic end face dry. The predominantly water-based cleaning solution contains water, water soluble organic solvents, propylene glycol ethers and isopropanol. Also disclosed is a method for cleaning a fiber optic end face using an aqueous solution.

7 Claims, 1 Drawing Sheet

AQUEOUS FIBER OPTIC CLEANER

BACKGROUND OF THE INVENTION

The present invention pertains to a cleaning solution and a method of use thereof. More particularly, the present invention is directed to an aqueous solution for cleaning the ends of fiber optics and fiber optic connectors.

Isopropyl alcohol (isopropanol, IPA) is the customary solvent used to clean fiber optic connector end faces. It is commonly taught, in fact, to use industrial or spectroscopic grade methanol or isopropyl alcohol exclusively, because commercial grade isopropyl alcohol has traces of water and minerals. Knowledgeable fiber optic users traditionally teach away from using water-based cleaners; as a result, water-based cleaners are not widely used for fiber optic connector end face cleaning currently.

While it is commonly taught that water should not be used to clean fiber optic end faces, water does, nevertheless, find its way into the fiber end face during cleaning. Water is present as an impurity in the most common end face cleaning solvent, isopropanol.

Isopropanol (also known as isopropyl alcohol or IPA) is completely miscible in water and water is completely miscible in isopropanol. IPA is also hygroscopic, able to absorb moisture from the air. Isopropanol is commonly available and used at a variety of concentrations for fiber optic cleaning. Common concentrations of IPA/water solutions are 99.5 percent to 99.9 percent IPA with the balance being water, 91 percent IPA/9 percent water and 70 percent IPA/30 percent water.

The highest grade IPA is unable to remove both ionic and non-ionic contaminants such as buffer gels, lubricants, and oily residues in combination with dusty soils. In comparison, the cleaning strength and solubility of the IPA/water blends, including those listed above, have a limited ability to clean light soils and polar soils; but non-polar and heavy soils cannot be cleaned effectively with known IPA/water blends. Furthermore, existing IPA/water mixtures are flammable and must be transported as hazardous material, which incurs extra risk and expense.

Other known water-based cleaners contain non-volatile surfactants, non-volatile pH control agents, chelating agents and other additives such that any non-volatile component could be left behind after the liquid has evaporated and become a contaminant.

Water-based glass cleaners and general purpose cleaners which contain propylene glycol ethers are widely known and commercially available from many sources. However, those cleaners contain surfactants (e.g. linear alkyl benzene sulfates) to emulsify oily soils, bases (amines or hydroxides) to raise pH, and chelating agents (when formulations are made with hard or non-deionized water).

All other known fiber end face cleaning solvents are non-aqueous based solvents and have known deficiencies. For example, non-volatiles in other formulations can contaminate the end face. Metal containers require non-volatile chemicals because volatile chemicals corrode the metal. Water-based products used on metals require agents to prevent corrosion or require plastic containers. In addition, some solvents are flammable, and the non-flammable solvents tend to be very expensive.

Accordingly, there is a need for an aqueous fiber optic connector end face cleaning solution. Desirably, such a cleaning solution is formulated with volatile components that will not redeposit back onto the end face. More desireably, such a cleaning solution is non-flammable, economical, non-hazardous, and easy to use, transport, and handle.

BRIEF SUMMARY OF THE INVENTION

A water-based cleaning solution containing water, water soluble organic solvents, propylene glycol ethers and isopropanol has been found to effectively clean fiber optic end faces. The solution contains, approximately by weight, 4 percent propylene glycol n-butyl ether, 2 percent propylene glycol methyl ether, 1.2 percent tripropylene glycol methyl ether, 1.5 percent isopropanol, and 91.3 percent deionized water.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
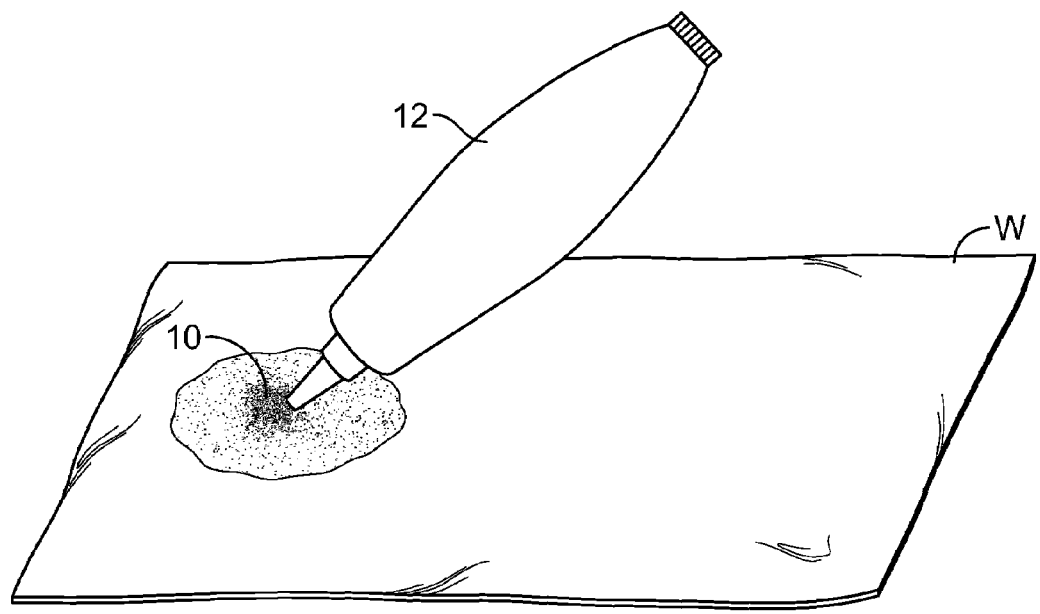
FIG. 1 is a perspective view of the present solution being dispensed from a pen onto a wipe.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

A water-based cleaning solution containing water, water soluble organic solvents, propylene glycol ethers and isopropanol, in accordance with the present invention, has been found to effectively clean fiber optic connector end faces.

In a preferred embodiment, the formula of the cleaning solution, by weight, is: 4 percent propylene glycol n-butyl ether, 2 percent propylene glycol methyl ether, 1.2 percent tripropylene glycol methyl ether, 1.5 percent isopropanol, and 91.3 percent deionized water.

The components in the present embodiment are all 100 percent volatile, producing vapors readily, both at room temperature and normal atmospheric pressure. Vapors escape easily from volatile liquid chemicals, such that the formula of the present invention dries readily without leaving contaminants on the surface.

The present aqueous cleaning solution can remove the full array of soils from polar to non-polar (salts, body oils, heavy viscous grease, tars, markers, lubricants and some adhesives). Traditional IPA/water blends cannot remove these substances; the present blend of IPA/water however, is able to remove these substances. The propylene glycol ethers listed previously to form the present IPA/water blend are needed to dissolve and couple with all soil types, including the polar and non-polar soil types listed above, allowing for the reduced IPA and increased water content in the present solution compared with prior cleaning solutions which are predominantly isopropyl alcohol.

In the present embodiment, the water-based cleaning solution (approximately 5 g) can be loaded into a soft plastic pen body with different spring loaded valve tips. Dispensing a water-based fiber optic end face cleaning product by pen 12 is novel. Pen dispensers are currently used with non-aqueous-based cleaning solvents for flux removing, connector end face cleaning, and conformal coating removal. The pens used for non-aqueous based cleaners usually have metal bodies with felt tips and rely on gravity to release the liquid. It is contemplated that the pens and tips for the present invention are plastic and rely on squeezing the soft pen body, as well as gravity, to release the cleaning solvent.

Packaging of the aqueous cleaning solution should not be limited to pens, however. Pre-saturated wipes, either individually or in tubs, are also possible with the present water-based chemical composition of the cleaning solution. Currently used nonflammable, non-aqueous solvents containing halogenated cleaning compounds, such as HFE (hydrofluoroethers) and HFC (hydrofluorocarbons) are too volatile, and have too high of a vapor pressure, to be contained in a pouch. The vapor pressure of the present water-based product, however, is low enough to be contained in the pouch at normal temperatures. Plastic or glass bottles are also contemplated, including plastic bottles with trigger spray nozzles or squeeze dropper tipped bottles.

Important to note is that fact that the present solution is an effective cleaner that is dilutable with a very low cost component: water. The water content of the cleaning solvent allows for the solution to be a fraction of the cost for pure isopropanol (IPA). In fact, a concentrated form of the present solution is contemplated where an end user will add water to dilute the formula to its desired concentration. Such a concentrated form of the present solution will greatly reduce the storage space necessary, as well as increase the portability of the solution.

In addition, the cost of the present cleaning solution is also lower because it contains no fluorinated solvents. Current cleaning products that are non-flammable and fast drying are relatively expensive because they contain fluorinated solvents (HFC and HFE). The present water-based cleaning solution does not have this added cost.

Figure 2:
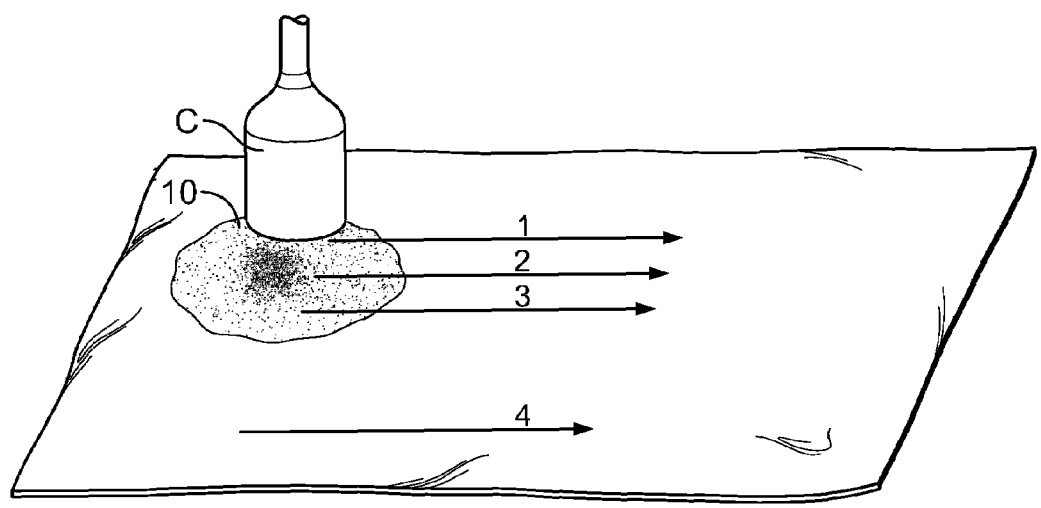
FIG. 2 is a perspective view of the wet-to-dry method of cleaning using the present solution.

The present aqueous-based solvent and dispenser can be used in conjunction with the cleaning method known as the combination cleaning process (disclosed in Forrest, U.S. Pat. No. 6,865,770, which patent is commonly assigned with the present application and herein incorporated by reference). In the combination cleaning process, a spot of solvent 10 is applied to a wipe W by applicator 12, while the wipe W rests on a soft surface, as shown in FIGS. 1-2. The connector end face C is placed on the wet spot 10, then drawn to the dry portion of the wipe W as shown by directional arrows 1-4. This happens in one continuous motion to remove the soiled solvent before the soil has an opportunity to dry and redeposit onto the end face. This is repeated three times to clean the end face. Then the end face is placed on a dry area of a wipe and with one swipe 4, any remaining wet portions are wiped dry.

In this manner, soil is dissolved in the cleaning liquid or lifted into the cleaning liquid then the soiled solvent is wiped from the end face.

As set forth above, there are many advantages of the aqueous fiber optic cleaning solution of the present invention. The solution can effectively remove both polar and non-polar soils. All of the components are volatile and will not redeposit back onto the end face. The solution is non-flammable, and therefore, much more easily transported by field personnel performing fiber optic installations or maintenance. The solution can be carried in a variety of ways including plastic tube and on wipes in pouches. The solution is economical to make and non-hazardous, thereby making it easy to use, transport, and handle.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A process for cleaning fiber optic connector end faces, which comprises:
    exposing the fiber optic connector end face to an aqueous solution, the aqueous solution comprising water, propylene glycol n-butyl ether, propylene glycol methyl ether, tripropylene glycol methyl ether, and isopropanol; and
    wiping the fiber optic connector end face dry.

2. The process for cleaning fiber optic connector end faces of claim 1 wherein the aqueous solution cleans polar and non-polar soils.

3. The process for cleaning fiber optic connector end faces of claim 1 wherein the aqueous solution is dispensed using a pen.

4. The process for cleaning fiber optic connector end faces of claim 1 wherein the aqueous solution is dispensed in a pre-saturated wipe.

5. The process of cleaning fiber optic connector end faces of claim 1, wherein the aqueous solution is approximately 4 percent by weight of said propylene glycol n-butyl ether.

6. The process of cleaning fiber optic connector end faces of claim 1, wherein the aqueous solution is approximately 2 percent by weight of said propylene glycol methyl ether.

7. The process of cleaning fiber optic connector end faces of claim 1, wherein the aqueous solution is approximately 1.2 percent by weight of said tripropylene glycol methyl ether.

* * * * *